US011308266B1

(12) United States Patent
Estrada Diaz

(10) Patent No.: US 11,308,266 B1
(45) Date of Patent: Apr. 19, 2022

(54) AUGMENTED REALITY ASSISTED PHYSICAL FORM COMPLETION

(71) Applicant: Google LLC, Mountain View, CA (US)

(72) Inventor: Omar Estrada Diaz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/949,205

(22) Filed: Oct. 20, 2020

(51) Int. Cl.
*G06F 40/174* (2020.01)
*G06F 9/451* (2018.01)
*G06F 3/16* (2006.01)
*G06K 9/00* (2006.01)
*G06F 3/01* (2006.01)
*G06T 19/00* (2011.01)

(52) U.S. Cl.
CPC ............ *G06F 40/174* (2020.01); *G06F 3/011* (2013.01); *G06F 3/167* (2013.01); *G06F 9/453* (2018.02); *G06K 9/00449* (2013.01); *G06T 19/006* (2013.01)

(58) Field of Classification Search
CPC ........ G06F 40/174; G06F 9/453; G06F 3/011; G06F 3/167; G06T 19/006; G06K 9/00449
See application file for complete search history.

(56) References Cited

U.S. PATENT DOCUMENTS

| | | | |
|---|---|---|---|
| 10,229,100 B1* | 3/2019 | Lesner | G06T 11/00 |
| 10,699,145 B1* | 6/2020 | Bertrand | G06K 9/00483 |
| 10,877,568 B2* | 12/2020 | Huang | G06K 9/00355 |
| 10,990,240 B1* | 4/2021 | Ravasz | G06F 1/1694 |
| 2013/0222381 A1* | 8/2013 | Di Censo | G06F 3/0304 |
| | | | 345/424 |
| 2014/0188756 A1* | 7/2014 | Ponnavaikko | G06Q 10/10 |
| | | | 705/342 |

(Continued)

OTHER PUBLICATIONS

Peng et al. 2010. Portable form filling assistant for the visually impaired. In Proceedings of the 24th BCS Interaction Specialist Group Conference (BCS '10). BCS Learning & Development Ltd., Swindon, GBR, 269-277. Accessed Mar. 18, 2021. https://dl.acm.org/doi/10.5555/2146303.2146343 (Year: 2010).*

(Continued)

*Primary Examiner* — Kieu D Vu
*Assistant Examiner* — Rami R Okasha
(74) *Attorney, Agent, or Firm* — Brake Hughes Bellermann LLP

(57) ABSTRACT

Systems and methods are described for receiving, at a wearable electronic device, a cue to trigger a form-filling mode in which the wearable electronic device includes memory, at least one camera and the at least one processing device. Responsive to receiving the cue, the systems and methods may trigger the at least one camera to capture an image of a physical form where the physical form includes a plurality of fields, and wherein the wearable electronic device uses the image to analyze the plurality of fields, obtain information to complete said fields. The systems and methods may also include detecting a hover input over a respective blank field in the plurality of fields, retrieving, based on the respective blank field and the stored information, a portion of the stored information to fill in the respective blank field, and providing, by the wearable device, the retrieved portion.

20 Claims, 7 Drawing Sheets

(56) References Cited

U.S. PATENT DOCUMENTS

| | | | |
|---|---|---|---|
| 2014/0237342 A1* | 8/2014 | King | G06F 16/955 |
| | | | 715/224 |
| 2015/0078671 A1* | 3/2015 | van Deventer | G06K 9/00449 |
| | | | 382/217 |
| 2015/0205777 A1* | 7/2015 | Campanelli | G06K 9/00449 |
| | | | 715/226 |
| 2015/0220778 A1* | 8/2015 | Macciola | G06K 9/2018 |
| | | | 382/112 |
| 2016/0098698 A1* | 4/2016 | Gopalakrishna | G06Q 20/322 |
| | | | 705/71 |
| 2016/0217119 A1* | 7/2016 | Dakin | G06F 40/274 |
| 2016/0334941 A1* | 11/2016 | Nader | G06F 3/0425 |
| 2017/0192493 A1* | 7/2017 | Ofek | G06F 3/04883 |
| 2017/0192950 A1* | 7/2017 | Gaither | G06F 9/453 |
| 2017/0223342 A1* | 8/2017 | Tan | H04N 13/254 |
| 2017/0336933 A1* | 11/2017 | Hassel | G06F 3/0484 |
| 2019/0139280 A1* | 5/2019 | Hubel | G06T 19/006 |
| 2019/0369714 A1* | 12/2019 | Pla I. Conesa | G06F 3/016 |
| 2020/0125322 A1* | 4/2020 | Wilde | G06F 1/163 |
| 2020/0167412 A1* | 5/2020 | Rakshit | G06F 3/04883 |
| 2020/0356251 A1* | 11/2020 | Gobera Rubalcava | |
| | | | G06F 3/04883 |

OTHER PUBLICATIONS

"Affordable Glasses Helping Those with Visual Disabilities Now Receiving Crowdfunding", Cool Blind Tech, retrieved on Jul. 27, 2020 from https://coolblindtech.com/affordable-glasses-helping-those-with-visual-disabilities-now-receiving-crowdfunding/, Feb. 21, 2018, 11 pages.

"Device Mounted on Glasses for the Blind Provides a New Way of Independance", OrCam MyEye Jun. 1, 2017, 9 pages.

Gibbs, "Why is OrCam the Best of out of All Low Vision Assistive Devices I Have Tried?", https://www.orcam.com/en/blog/why-im-using-orcam-in-graduate-school/, Oct. 22, 2015, 2 pages.

* cited by examiner

AUGMENTED REALITY ASSISTED PHYSICAL FORM COMPLETION

TECHNICAL FIELD

This description generally relates to methods, devices, and algorithms used to assist a user in entering data into a physical form.

BACKGROUND

When visiting particular businesses, completion of physical documents is a standard request. While many physical documents are available in a digital format with automated document filling available, it is often necessary to enter information into a physical document by hand. Filling in such documents often involves a user retrieving data from a variety of sources. There is a need to improve the process of retrieving data for physically completing a physical (e.g., tangible) document.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method configured to perform operations with at least one processing device is described. The operations may include receiving, at a wearable electronic device, a cue to trigger a form-filling mode, the wearable electronic device including memory, at least one camera and at least one output source, and at least one processing device. The at least one processing device may, responsive to receiving the cue, trigger, by the wearable device, the at least one camera to capture an image of a physical form where the physical form includes a plurality of fields, and wherein the wearable electronic device uses the image to analyze the plurality of fields, obtain information to complete the plurality of fields, and store the obtained information in the memory. The operations may further include detecting, by the wearable electronic device, a hover input over a respective blank field in the plurality of fields, retrieving, by the wearable device and based on the respective blank field and the stored information, a portion of the stored information to fill in the respective blank field, and providing, by the wearable device, the retrieved portion of the stored information.

Implementations may include any of the following features alone or in combination. For example, the operations may further include in response to detecting respective field completion or an indication to skip the respective field, generating, at the wearable electronic device, a first audio response including an audible output of text associated with the respective blank field and an audible output of the portion of the stored information to fill in the respective field and triggering, based on a detected location associated with the hover input, a second audio response to guide a user wearing the wearable electronic device to another blank field in the plurality of fields. In some implementations, the operations may further include in response to determining that information is unavailable for at least one of the plurality of fields: triggering a third audio response to audibly indicate an information source that can be accessed, detecting access of the information source, by the wearable electronic device using the at least one camera, and triggering the at least one camera to capture a second image, the second image including auxiliary data associated with the information source, and triggering a fourth audio response to audibly indicate the auxiliary data to guide the user to enter at least some of the auxiliary data into the at least one of the plurality of fields.

In some implementations, the cue is an audible cue and the operations further include generating, at the wearable electronic device, a first visual cue including text to be entered into the respective blank field, the text to be entered including the portion of the stored information. In some implementations, the wearable electronic device comprises augmented reality (AR) glasses that detect the plurality of fields in the physical form based on the physical form being within a field of view of the AR glasses and the cue includes a detected interaction with a control of the wearable electronic device, the control configured with a touch pattern to trigger the form-filling mode.

In some implementations, the hover input is performed using a writing utensil and detecting the hover input includes using the at least one camera to determine tracking data associated with the writing utensil, wherein the tracking data tracks movement of the writing utensil within a field of view of the wearable electronic device. In some implementations, retrieving the portion of the information is based on the tracking data.

In some implementations, the operations further include repeating until detecting completion of the physical form: detecting, by the wearable electronic device, a hover input over a respective blank field in the plurality of fields, retrieving, based on the respective blank field and the stored information, a portion of the information to fill in the respective blank field, generating, at the wearable electronic device, another audio response including an audible output of text associated with the respective blank field and an audible output of the portion of the information to fill in the respective field, detecting respective field completion or an indication to skip the respective field, and triggering, based on a detected location associated with the hover input, yet another audio response to guide a user wearing the wearable electronic device to another blank field in the plurality of fields.

In a second general aspect, a wearable electronic device is described and includes at least one processing device, at least one camera, at least one output source and a memory storing instructions that when executed cause the wearable electronic device to perform operations. The operations may include receiving an audible cue to trigger a form-filling mode and responsive to receiving the audible cue, triggering the at least one camera to capture an image of a physical form, the physical form including a plurality of fields where the wearable electronic device uses the image to analyze the plurality of fields, obtain information to complete the plurality of fields, and store the obtained information in the memory. The operations may further include detecting a hover input over a respective blank field in the plurality of fields, retrieving, based on the respective blank field and the stored information, a portion of the stored information to fill in the respective blank field, and providing the retrieved portion of the stored information.

Implementations may include any of the following features alone or in combination. For example, the operations further include in response to detecting respective field completion or an indication to skip the respective field, generating, at the wearable electronic device, a first audio response including an audible output of text associated with the respective blank field and an audible output of the portion of the stored information to fill in the respective field and triggering, based on a detected location associated with the hover input, a second audio response to guide a user wearing the wearable electronic device to another blank field in the plurality of fields.

In some implementations, the wearable electronic device includes a display, and the operations further include generating, at the display of the wearable electronic device, a first visual cue including text to be entered into the respective blank field, the text to be entered including the portion of the stored information. In some implementations, the wearable electronic device comprises augmented reality (AR) glasses and the AR glasses detect the plurality of fields in the physical form based on the physical form being within a field of view of the AR glasses.

In some implementations, the hover input is performed using a writing utensil and detecting the hover input includes using the at least one camera to determine tracking data associated with the writing utensil, wherein the tracking data tracks movement of the writing utensil within a field of view of the wearable electronic device.

In a third general aspect, a non-transitory, machine-readable medium having instructions stored thereon, the instructions, when executed by a processor, cause a computing device to receive, at a wearable electronic device, an audible cue to trigger a form-filling mode, the wearable electronic device including at least one camera. Responsive to receiving the audible cue, the operations may trigger, by the wearable electronic device, the at least one camera to capture an image of a physical form, the physical form including a plurality of fields, wherein the wearable electronic device uses the image to analyze the plurality of fields, obtain information to complete the plurality of fields, and store the obtained information in the memory. The operations may further detect, by the wearable electronic device, a hover input over a respective blank field in the plurality of fields, retrieve, by the wearable electronic device and based on the respective blank field and the stored information, a portion of the stored information to fill in the respective blank field, and provide the retrieved portion of the stored information via the wearable electronic device.

Implementations may include any of the following features alone or in combination. For example, instructions and/or operations may include generating, at the wearable electronic device, a first audio response including an audible output of text associated with the respective blank field and an audible output of the portion of the stored information to fill in the respective field in response to detecting respective field completion or an indication to skip the respective field. The instructions and/or operations may further include triggering, based on a detected location associated with the hover input, a second audio response to guide a user wearing the wearable electronic device to another blank field in the plurality of fields.

In some implementations, the instructions and/or operations may further include in response to determining that information is unavailable for at least one of the plurality of fields: triggering a third audio response to audibly indicate an information source that can be accessed, detecting access of the information source, by the wearable electronic device using the at least one camera, and triggering the at least one camera to capture a second image, the second image including auxiliary data associated with the information source, and triggering a fourth audio response to audibly indicate the auxiliary data to guide the user to enter at least some of the auxiliary data into the at least one of the plurality of fields.

In some implementations, the instructions and/or operations may further include generating, at the wearable electronic device, a first visual cue including text to be entered into the respective blank field, the text to be entered including the portion of the stored information. In some implementations, the hover input is performed using a writing utensil and detecting the hover input includes using the at least one camera to determine tracking data associated with the writing utensil, wherein the tracking data tracks movement of the writing utensil within a field of view of the wearable electronic device. In some implementations, retrieving the portion of the information is based on the tracking data.

In some implementations, the wearable electronic device is augmented reality (AR) glasses and the AR glasses detect the plurality of fields in the physical form based on the physical form being within a field of view of the AR glasses.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
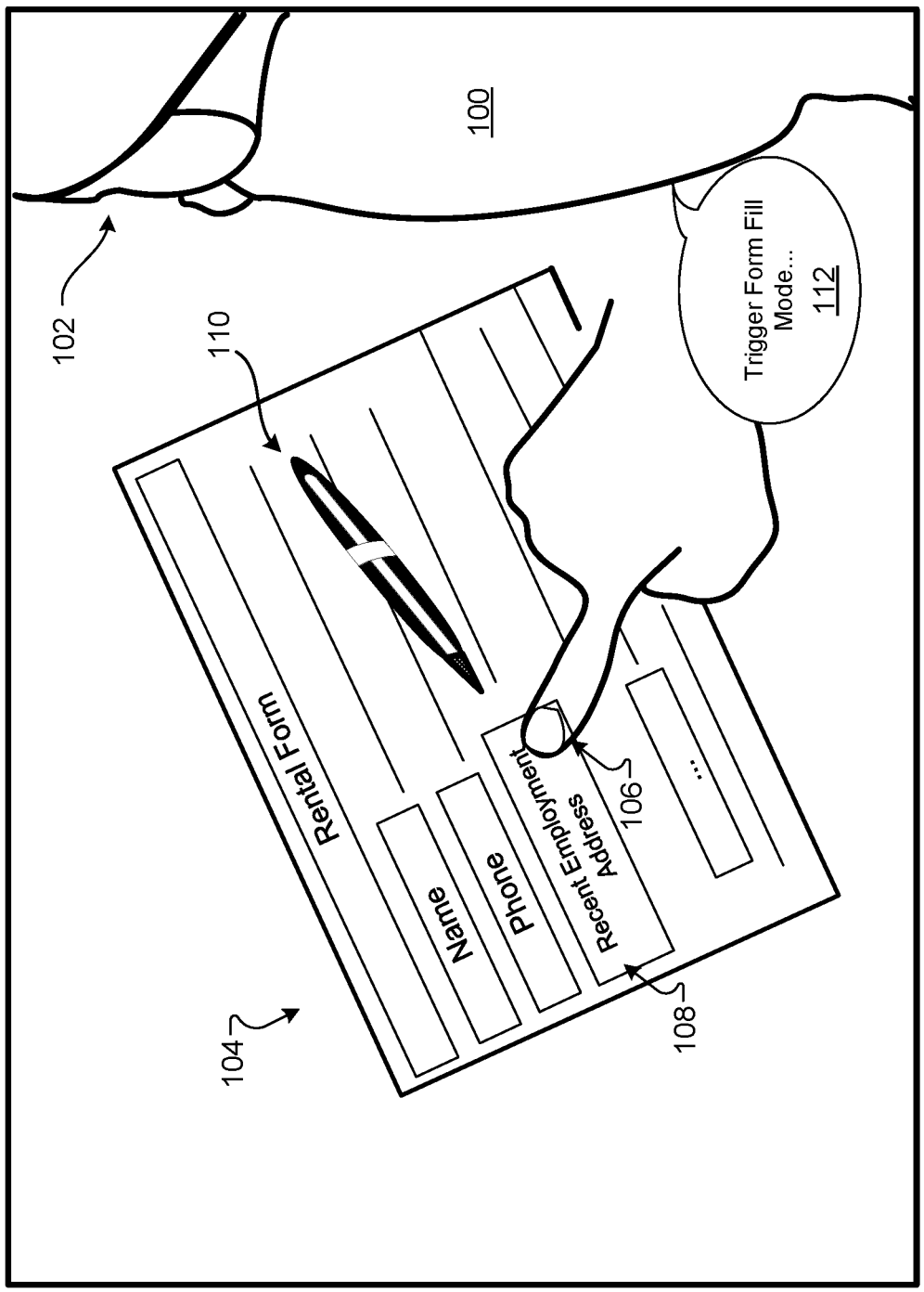
FIGS. 1A-1B are block diagrams illustrating an Augmented Reality (AR) wearable device being used to assist a user in entering data into a physical form, according to implementations described throughout this disclosure.

In general, this document describes examples related to using a wearable Augmented Reality (AR) device to detect document data, obtain data associated with the document, and assist a user to physically enter text (e.g., handwritten data) into the document using the obtained data. In general, the documents described herein pertain to physical forms configured for completion with a writing utensil (e.g., a pen, pencil, marker, etc.). However, in some implementations, the documents described herein may be an electronic representation of the form presented on an electronic device and the writing utensil may be a stylus that may be used to enter data in the form by using free form input to manually write the data into the fields of the form.

The systems and methods described herein are configured to assist a user wearing an electronic device with form field entry and to provide guidance to complete a particular image-captured form. In various examples described herein, the electronic device is a pair of AR glasses (e.g., smart glasses, AR headset, HMD device, etc.). The AR glasses may detect input fields in such a form, retrieve information pertaining to the input fields, and logically provide the retrieved information as assistive data, according to which input field a user may be hovered upon and/or otherwise focused upon. In some implementations, the assistive data is provided audibly via the AR glasses. In some implementations, the assistive data is provided visually via the AR glasses. In some implementations, the assistive data is provided audibly and visibly via the AR glasses. The user wearing the AR glasses may use the provided assistive data to manually fill in fields of the physical form with a writing utensil, for example. Upon receiving the assistive data audibly and/or visually, the user may begin to physically fill in the particular input fields of the form.

In some implementations, the wearable device (e.g., smart glasses) may function using the techniques described herein to assist users with vision impairment. For example, a user that cannot fully view the physical form may hover a finger, writing utensil, or other viewable object over fields and labels in the form. The wearable device may detect a location in which the user hovers and may retrieve corresponding information to assist the user to fill in the form. For example, the wearable device may retrieve the information for a blank field and may audibly or visibly provide the information to the user. The visibly provided information may be provided in a larger, bolder font, for example. The user may view or listen to the information and fill in the blank field with the provided audible or visual information. For example, if the user hovers on a name field in a physical form, the device may recite the form label "name" and may retrieve the name of the user using the AR glasses and audibly and/or visually provide the retrieved name so the user may fill in the empty field with the retrieved name. Although the user may know the information for her name, the user may not be able to read the form and as such, the AR glasses can analyze the form, retrieve the data, and direct the user to complete the form appropriately.

In some implementations, the wearable device may additionally provide guidance to a user with impaired vision by capturing image content of a writing utensil on or near the form (i.e., held by the user). The guidance may include directional instructions such as left, right, up, down, forward, backward, etc. to enable the user to properly fill in the physical form.

In some implementations, the techniques described herein can be used with an electronic assistant software triggered by a wake word. For example, the wearable device may include electronic assistant software which wakes upon receiving the wake word and a command. The command may be to enter a form-filling mode in which the software begins to assist the user to enter data into physical form.

In some implementations, the techniques described herein may trigger provision of verbal/audio responses (e.g., cues) when a user hovers or rests a writing utensil over a field in a physical form. For example, one or more cameras associated with the wearable device may detect the hover and the form and may generate information pertaining to the form and one or more fields in which a hover is detected. In some implementations, detecting hover movements may include detecting hand movements or writing utensil/stylus movements. Such detection methods may include the use of object detection machine learning models. Such models may be trained and learned based on previous information provided by a user in a physical form. For example, the wearable device may, for example, capture content via a camera of data for any number of data sources. The data sources may be retrieved at a later time for purposes of assisting the user to fill in a physical form. In some implementations, the user may trigger the wearable device to remember and store such data.

In some implementations, the techniques described herein may operate on the wearable device to capture data associated with a physical form and may translate form fields or other related data from the physical form in order to generate audio or visual data in multiple languages. For example, a pair of AR glasses may include one or more cameras to capture physical form data. Such physical form data may then be audibly read to the user to assist the user in filling in the form.

In addition, the systems and methods described herein utilize a smart phone in a similar fashion as the wearable device to capture form content and provide visual and/or audio feedback to the user to enable the user to complete the physical form. For example, the smart phone device may capture an image of the physical form using an application on the device. The systems and methods described herein may autocomplete the form using known user data provided on the device, according to user permissions. The user may use the information in the electronic version of the form to complete the physical version of the form.

Figure 1B:
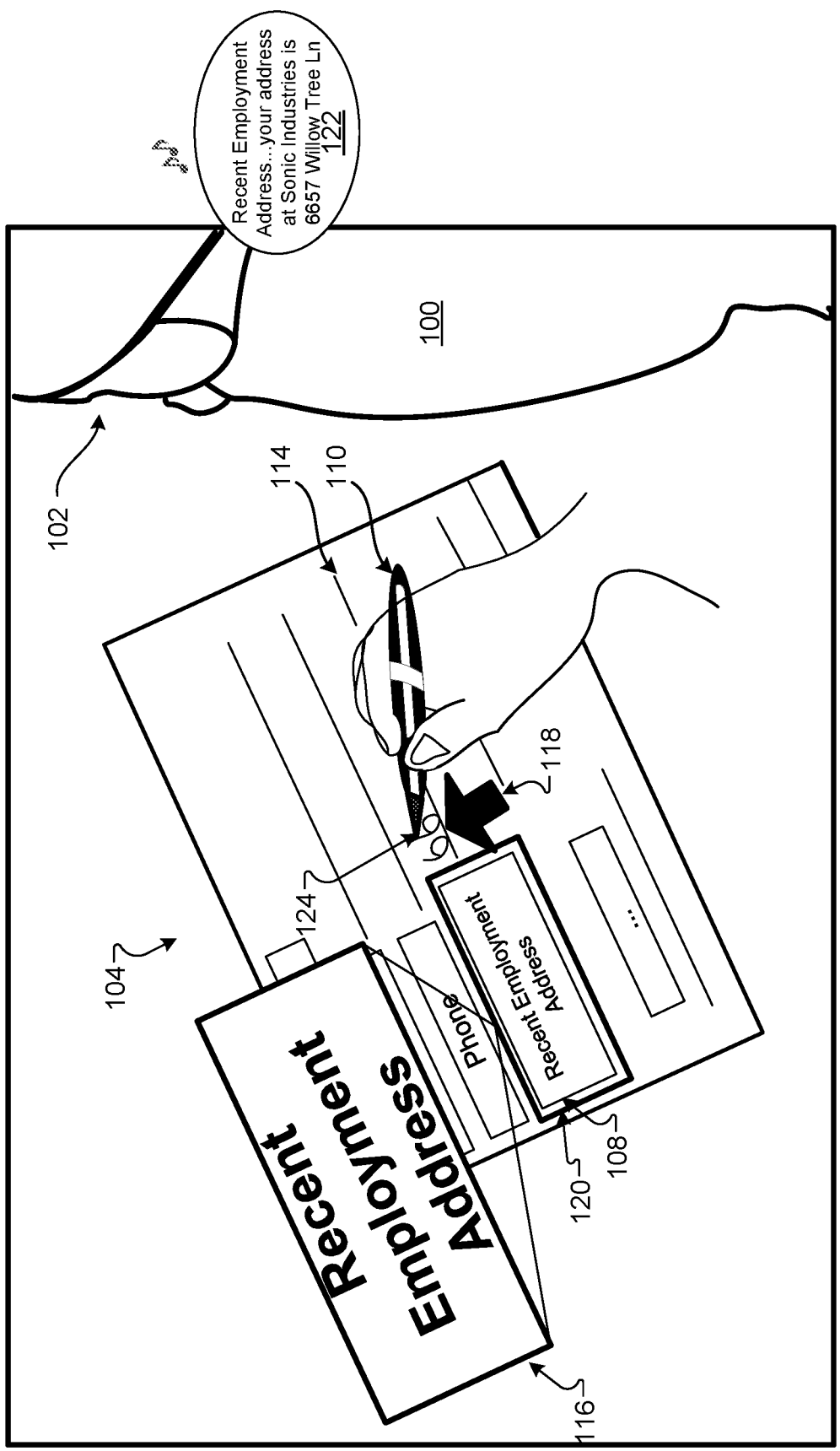

FIGS. 1A-1B are block diagrams illustrating an example AR wearable electronic device being used to assist a user in entering data into a physical form, according to implementations described throughout this disclosure. In this example, the AR wearable electronic device includes AR glasses (e.g., smart glasses, AR headset, HMD, etc.).

Referring to FIG. 1A, a user 100 is depicted wearing wearable electronic device 102 while beginning to fill out a physical form 104. In this example, the user 100 is hovering a finger 106 over a recent employment address field 108. In some implementations, the wearable electronic device 102 may detect the finger movement (e.g., touch, hover, etc.) with respect to the form 104 and may trigger additional information to be provided to the user. In some implementations, the user may use a writing utensil 110 to perform hover movements, rather than a finger or hand, since the physical form may have to be completed in ink or pencil.

In operation, the user 100 may walk into an apartment building to fill out a rental agreement form, such as form 104. The user may be wearing wearable electronic device 102 (or other wearable electronic device configured with form assistance software). The user may utter a wake word (or phrase) to trigger a form fill mode. For example, the user 100 shown in FIG. 1A uttered "Trigger Form Fill mode" wake phrase 112 to put the wearable electronic device 102 into a form fill mode. In response, the wearable electronic device 102 may assess a closest input field to a finger 106 or writing utensil 110, for example.

Referring to FIG. 1B, the user 100 is using writing utensil 110 (e.g., a pen) hovering over a blank field 114. The AR glasses 102 may detect the hover or locational position of utensil 110 on field 114. In response, the systems and methods described herein may trigger audial and/or visual information to be provided to the user filling out a physical form, such as form 104. In this example, the visual information includes a visual cue 116 providing a magnified version of the form label "Recent Employment Address." This can assist the user to better view the content in the form if, for example, the print of the form is too small for the user's visual ability. In addition, a visual cue 118 may also be provided. Visual cue 118 may include an arrow pointing to the blank field in which the user is to fill. Another example cue may include visual cue 120 illustrating a box around a label of the field to clearly indicate which text is being magnified.

In addition to visual cues 116-120, audial cues (or other cues) may be provided by wearable electronic device 102. For example, responsive to detecting the hover of utensil 110, the systems and methods described herein may obtain data associated with the field 114 (or other field corresponding to the hover of the utensil 110) and may generate audible cue shown in audio cue 122 to indicate data that may be used for the user to manually complete the form. In this example, audible cue 122 includes a field name "Recent Employment Address" and data to fill the field (e.g., "your address at Sonic Industries is 6657 Willow Tree Ln . . . "), as shown in FIG. 1B. The information may be retrieved from previously stored user data (e.g., a resume, browser data, etc.). The user may use the audible and/or visual information to begin to fill in the blank field, as shown by input text 124. Other visual and/or audible cues are of course possible.

In some implementations, particular information for form filling or for provision audially or visually to the user may be retrieved from a companion mobile device communicably coupled (wired or wirelessly) to the wearable electronic device. For example, a companion mobile device may be wirelessly connected to the wearable electronic device. The mobile device may retrieve information from a cloud based resource, the Internet, or other available source of data.

In some implementations, forms may be filled in using the user's finger to manually enter the text content into an electronic version of a form, for example. The systems and techniques described herein may similarly assist the user filling out the electronic form by obtaining the information requested in the form and audibly and/or visually providing such data while the user completes the form on an electronic device.

Figure 2:
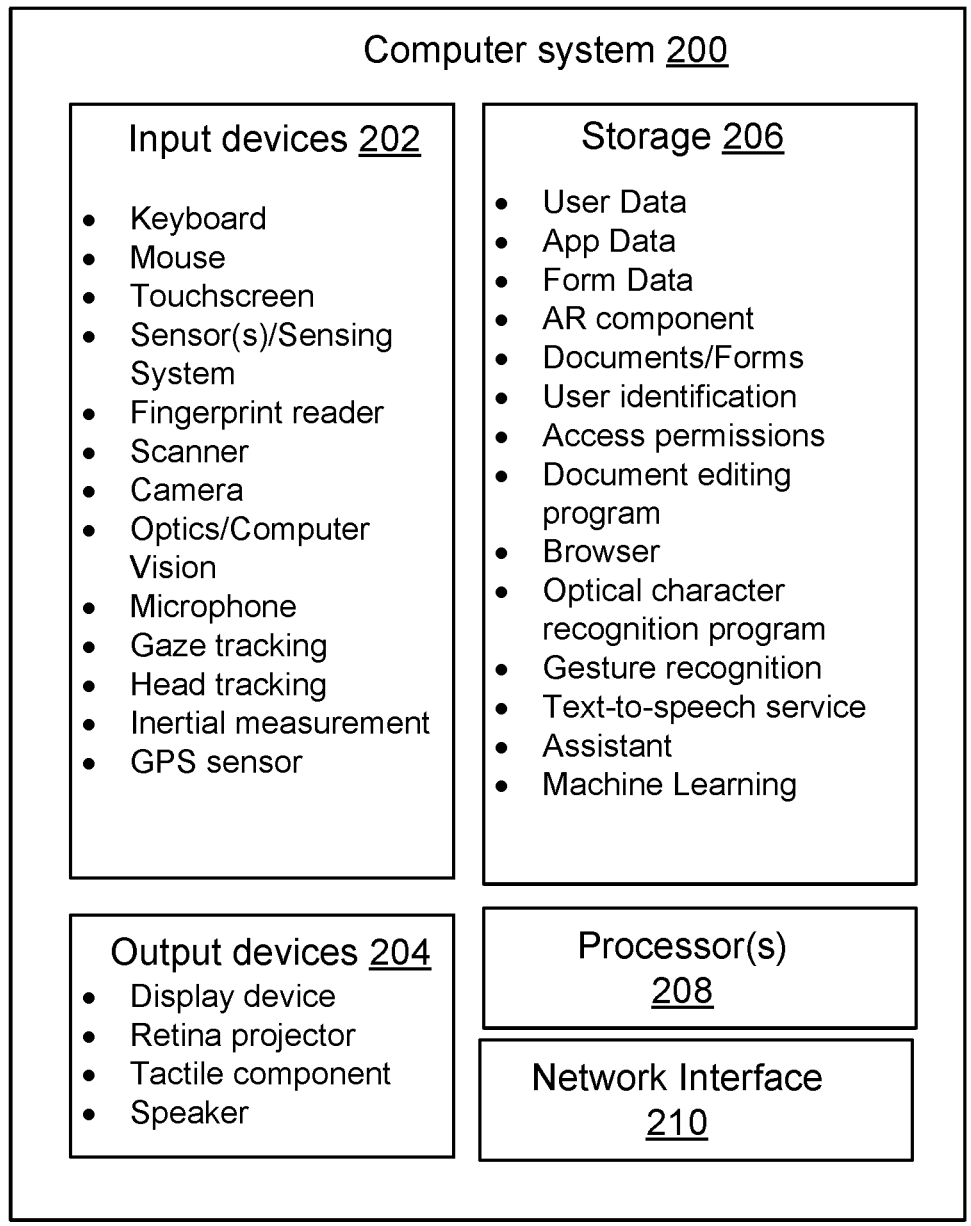
FIG. 2 is a block diagram of an example computer system for generating and providing audio and visual data to assist the user in entering data into a physical form, according to implementations described throughout this disclosure.

FIG. 2 is a block diagram of an example computer system 200 for generating and providing audio and visual data to assist the user in entering data into a physical form, according to implementations described throughout this disclosure. The computer system 200 may represent a wearable device, as described throughout this disclosure. The computer system 200 can be used with one or more other examples described elsewhere herein. The computer system 200 can be designed to have at least one processor to execute instructions stored in a computer-readable medium. For example, the computer system 200 can include some or all components described below with reference to wearable electronic device 102, FIG. 6, and/or other wearable device with processing power.

In some implementations, the computer system 200 can be characterized as performing in a client role and/or as being implemented at a client side. For example, the computer system 200 can be an AR headset (e.g., a set of AR glasses or another wearable or standalone AR device) that detects form fields in physical and/or virtual documents and provides data for filling the forms in an audible manner and/or visible manner. In some implementations, the computer system 200 can be characterized as performing in a server role and/or as being implemented at a server side. For example, the computer system 200 can perform a search based on detected locational hovering over a form field; if the server finds a match, further information can be provided to the client device.

The computer system 200 includes input devices 202. In some implementations, the input devices 202 can include a keyboard or other button, mouse, touchscreen, ring, one or more sensors, a fingerprint reader, a scanner, a camera or other image sensor, optics and/or computer vision hardware, a microphone, a gaze tracking component, head tracking component, an inertial measurement unit, and/or a global positioning system (GPS) sensor. The camera can be used to capture a view of a tangible instance of a document (e.g., a physical form) and in detecting content thereof. The touchscreen can allow a user to generate inputs as described herein. However, hover inputs may be detected by any number of sensors and/or cameras in order to trigger particular functionality of the computer system 200.

In some implementations, the system 200 may include multiple cameras. Any type of light-sensing technology can be used for capturing images, such as the types of image sensors used in digital cameras. The cameras can be of the same type or different types. Camera locations may be placed within any location on the wearable device.

The microphone can allow the user to enter a voice command, such as to perform an operation or to make a change in a document. The gaze tracking and head tracking components can allow computer system 200 (e.g., AR glasses or other wearable device) to determine where the user is currently looking (e.g., with reference to a document/form). The inertial measurement unit can detect if the computer system 200 is being moved (e.g., to detect proximity to another computer system).

The computer system 200 can include output devices 204. The output devices 204 can include a display device, a retina projector, a tactile component, and/or a speaker, just to name a few examples. The display device and/or the retina projector can serve to generate visual output that will provide a virtual aspect to be perceived by a user. For example, one or more documents, document edits, field information, controls, pages, windows, browsers, and/or desktops can be presented to assist the user in filling out particular forms or documents. The speaker can serve to provide audio output (i.e., responses, cues, etc.), for example, as generated by a text-to-speech application.

The computer system 200 can include at least one storage device 206. The storage device 206 can include user data, app data, and form data. For example, user data may be stored according to user permissions provided via computer system 200 (i.e., via AR glasses). The app data and form data may be stored according to user actions and permissions. Such data may be retrieved to fill out forms in the future, according to user provided permissions.

The computer system 200 can also include an AR component; documents/forms; user identification records for at least one user; access permissions for at least one user; a document editing program (e.g., for non-collaborative documents); a browser; a screen sharing program (e.g., as part of a videoconferencing application); an OCR program; a gesture recognition program; and/or a text-to-speech service application.

As another example, the AR component can be programmed to operate according to some or all examples described herein (e.g., to capture content, and/or to send, receive, or present information based on locating fields in a physical form). As another example, the documents/forms can be captured (e.g., camera captured or scanned) by the computer system 200, and/or received from another computer system. As another example, the user identification records can specify who the user is and/or identify one or more other computer systems associated with the user. As another example, the access permissions can specify whether the user is allowed to access an electronic document, form data, user data, and/or app data in the computer system 200 or another computer system.

As another example, the document editing program can allow a user of the computer system 200 to edit a form document if, for example, the document is accessed on another computing device interacting with computer system 200 (e.g., AR glasses) and the user is using a stylus to enter field data into the form document. As another example, the browser can allow a user of the computer system 200 to view documents, run programs, access stored user data, perform searches, etc. whether local to the computer system 200 or from a remote location. As another example, the OCR program can capture content from a physical instance of a form document.

As another example, the gesture recognition program can track a position of a user of the computer system 200 or a body portion of the user, such as to control an wearable device. As another example, the text-to-speech service application can provide a speech output to a user of the computer system 200 based on the content of a document (e.g., from an electronic document or a tangible instance of a form).

The computer system 200 can include at least one processor 208 to facilitate processing, as described throughout this disclosure. The computer system 200 can include at least one network interface 210 that allows communication between the computer system 200 and one or more other systems and/or devices. The network interface 210 can be configured for wireless and/or wired communication. For example, the network interface 210 can facilitate communication to search for corresponding documents and information to fill in forms.

Figure 3:
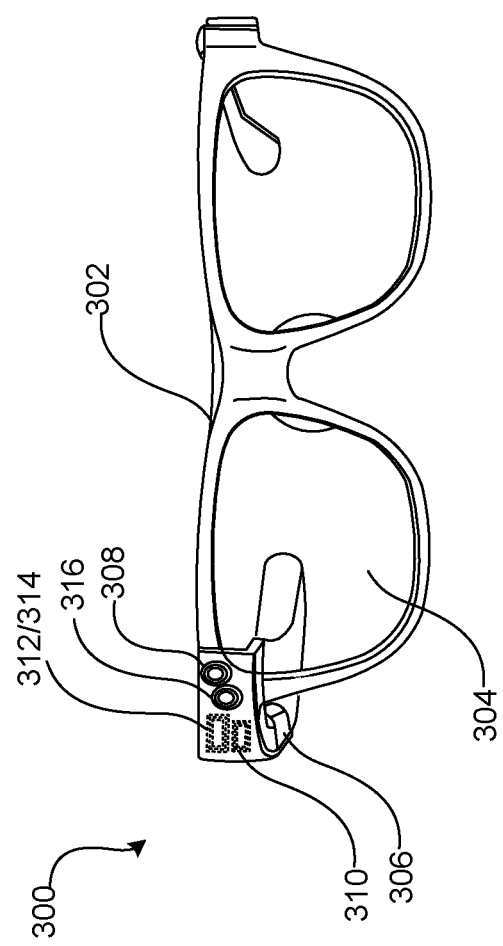
FIG. 3 is a front view of an example of an AR wearable device, according to implementations described throughout this disclosure.

FIG. 3 is a front view of an example of an AR wearable device, according to implementations described throughout this disclosure. In this example, the AR wearable device is a pair of AR glasses 300 (e.g., wearable electronic device 102 in FIG. 1A). In general, the AR glasses 300 may include any or all components of system 200 and system 600.

As shown in FIG. 3, the AR glasses 300 include a frame 302, with a display device 304 coupled in the frame 302 (or in the glass portion of frame 302). The AR glasses 300 also include an audio output device 306, an illumination device 308, a sensing system 310, a control system 312, at least one processor 314, and a camera 316.

The display device 304 may include a see-through near-eye display such as those using birdbath or waveguide optics. For example, such an optical design may project light from a display source onto a portion of teleprompter glass functioning as a beamsplitter seated at a 45 degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, etc.) generated by the display. In some implementations, waveguide optics may be used to depict content on display device 304 of AR glasses 300.

The audio output device 306 (e.g., one or more speakers) may be coupled to the frame 302. The sensing system 310 may include various sensing devices and the control system 312 including various control system devices to facilitate operation of the AR glasses 300. The control system 312 may include a processor 314 operably coupled to the components of the control system 312.

The camera 316 may be capable of capturing still and/or moving images. In some implementations, the camera 316 may be a depth camera that can collect data related to distances of external objects from the camera 316. In some implementations, the camera 316, may be a point tracking camera that can, for example, detect and follow one or more optical markers on an external device, such as, for example, optical markers on an input device, such as writing utensil 110. In some implementations, the AR glasses 300 may include an illumination device 308 that may selectively operate, for example, with the camera 316, for detection of objects (e.g., documents, form fields, etc.) in the field of view of the camera 316. The illumination device 308 may selectively operate, for example, with the camera 316, for detection of objects in the field of view of the camera 316.

AR glasses 300 may include a communication module (not shown) in communication with processor 314 and control system 312. The communication module may provide for communications between devices housed within AR glasses 300 as well as communication with external devices, such as, for example, controllers, mobile devices, and/or other computing devices. The communication module may enable the AR glasses 300 to communicate to exchange information with another computing device. For example, the AR glasses 300 may be operably coupled to another computing device, to facilitate communication via, for example, a wired connection, a wireless connection via for example, Wi-Fi or Bluetooth, or other type of connection.

Figure 4:
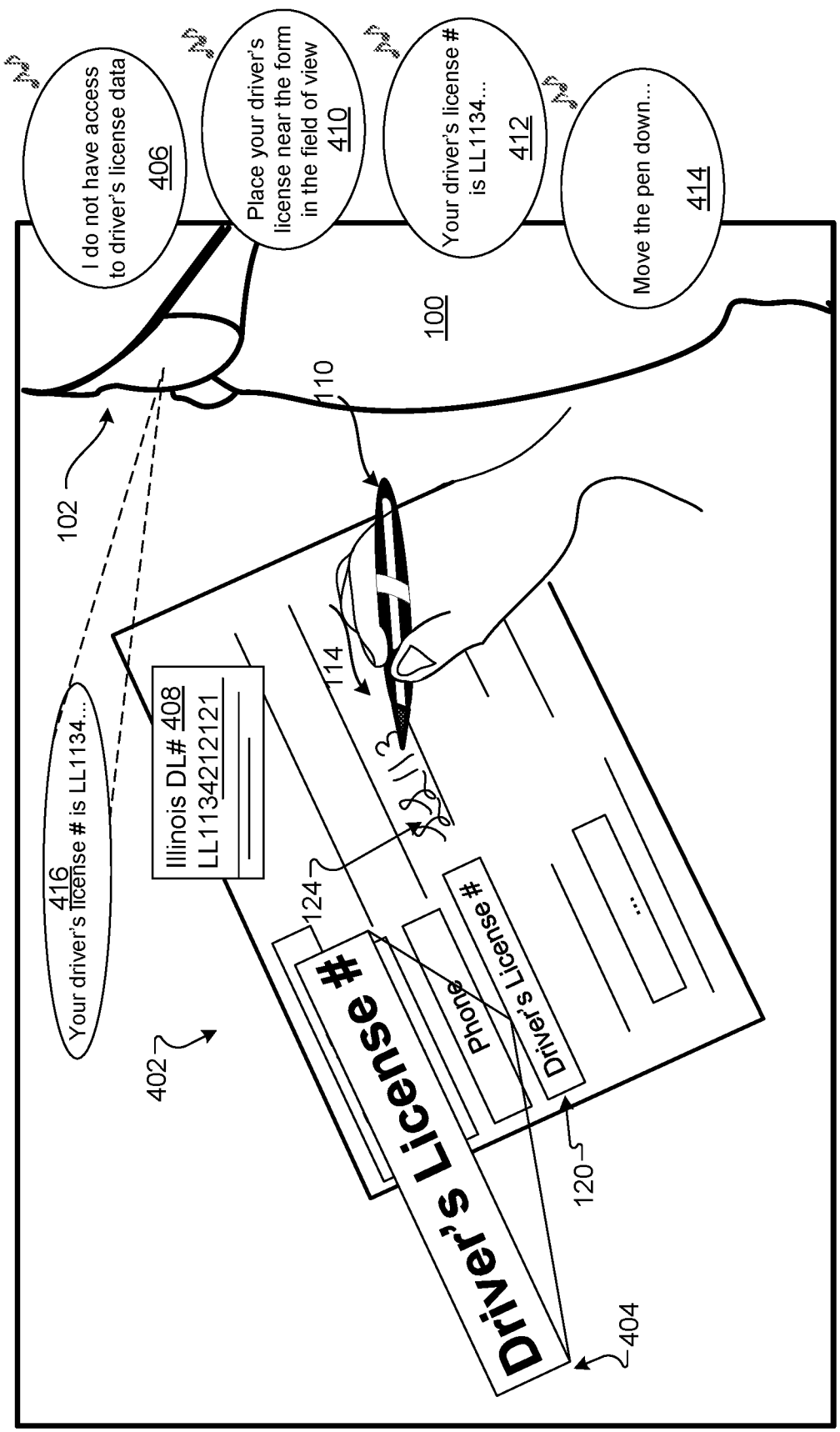
FIG. 4 is a block diagram illustrating an example of prompting the use of different information sources to trigger provision of audio and/or visual data to assist the user in entering data into a physical form, according to implementations described throughout this disclosure.

FIG. 4 is a block diagram illustrating an example of a prompting the use of information sources to trigger provision of audio and/or visual data to assist the user in entering data into a physical form, according to implementations described throughout this disclosure. As shown, the user 100 in FIG. 4 may have already entered a form fill mode using wearable electronic device 102.

In the example implementation shown in FIG. 4, the user 100 is wearing the wearable electronic device 102, for example, AR glasses/headset, with the example writing utensil 110 being captured by a camera onboard device 102. The wearable electronic device 102 may be, for example, wearable AR glasses 300 that can provide for the display of virtual content to the user and provide audio content to the user. In this example, the user is beginning to handwrite content in a document (e.g., form 402). The system 200 executing on AR glasses 300 may provide assistance as the user begins to fill in the form.

For example, the wearable electronic device 102 (e.g., AR glasses 300) may capture images of a physical document (e.g., form 402). The image of such a form may be used to search for information to fill in the form. For example, previous browser information may be used based on user permissions, to obtain information for filling in the form. Such information can be audibly provided via a speaker and/or visually provided via a display on the wearable electronic device. For example, the system 200 executing on AR glasses 300 may expand portions of text, such as text 404 to assist the user in reading the text and/or assist to indicate which blank field in which to begin entering data.

If the information for a particular field is unknown or not discovered in a search by the AR glasses 300, for example, the AR glasses 300 may audibly indicate that the information is unknown, as shown by audio cue 406. A user may redirect the device to find the information in another source. For example, the AR glasses 300 can indicate that the system does not have access to particular information, such as the driver's license information, as indicated by audio cue 406. The system AR glasses may additionally attempt to determine an information source that may be used to gather the unknown data.

In the example of the driving license number, the AR glasses 300 may indicate that the user should use a different information source. For example, the AR glasses 300 may direct the user to retrieve his physical driving license 408 and place the license near the form 402, as indicated by audio cue 410. In response to the user placing a driving license 408 near form 402, the AR glasses 300 may detect access of the alternative information source, and in response, the AR glasses 300 (using camera 316) may trigger a capture of an image of the license 408 (which is in addition to the previously captured image of the form 402). The image of the license 408 may include the driving license 408 with the auxiliary data associated with the information source (i.e., the information on the license 408).

The AR glasses 300 may additionally audibly ask (audio cue not shown) the user 100 whether or not to store/save the driving license auxiliary data obtained from the image of license 408. If the user agrees to store the information, the AR glasses may store the driving license information for future use.

After obtaining the driving license data, the AR glasses 300 may provide another audio and/or visual cue to assist the user to fill in the data. For example, the AR glasses 300 may be configured to read aloud the captured content of the license 408, as shown by audio cue 412. This may provide an advantage for a user with low vision, as the audio cue 412 can assist the user to fill in one or more fields on the form 402. Additional audio cues may be provided to further assist the user in position utensil 110 at one or more fields within form 402.

In some implementations, upon detecting completion of particular fields, the AR glasses may guide the user to move through the physical form. For example, audio cue 414 may provide audio guidance to the user to move to the next field by audibly indicating "move the pen down to the next blank to obtain the next cue," as shown in FIG. 4.

In some implementations, a visual cue may also be depicted if, for example, AR glasses 300 includes a display device. For example, the display device 304 of AR glasses 300 may generate and display a visual cue 416 indicating a view of the obtained driving license information. The user 100 may copy the driving license information from the visual cue 416 into form 402.

Figure 5:
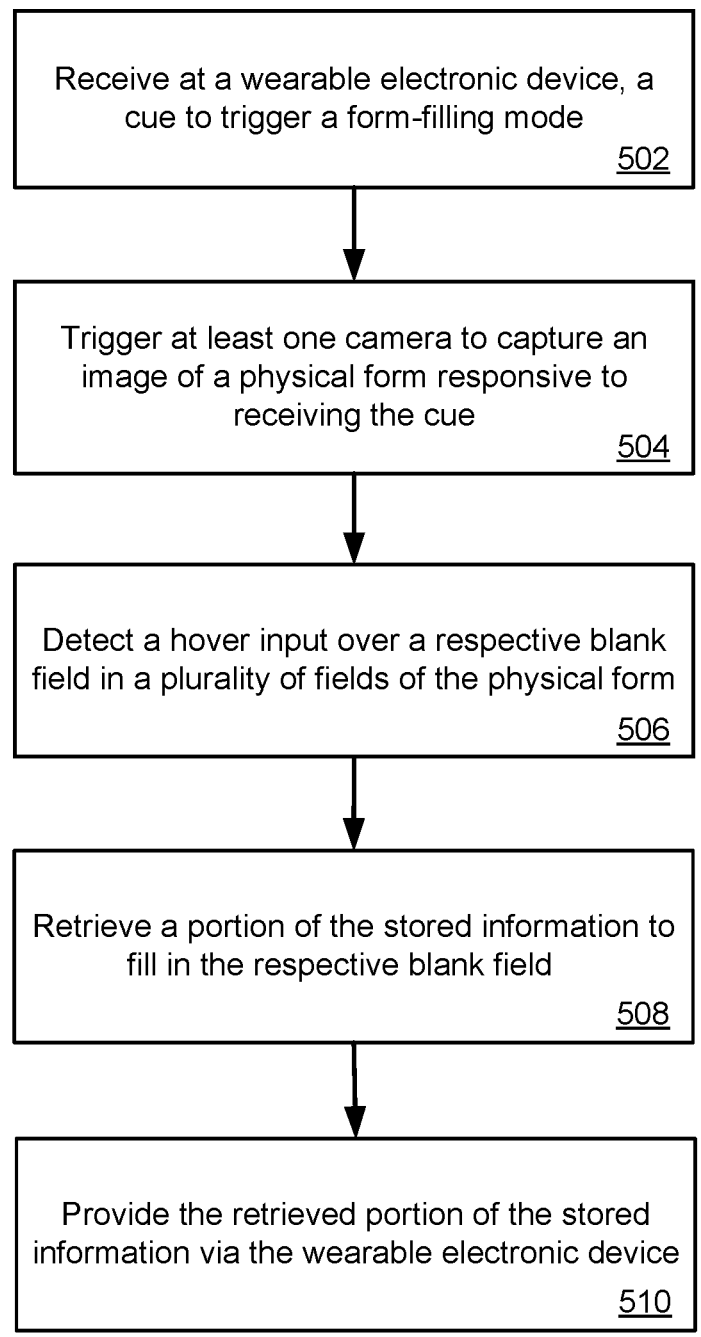
FIG. 5 is a flow chart diagramming one example of a process to use a wearable electronic device to assist a user to enter data into a physical document, according to implementations described throughout this disclosure.

FIG. 5 is a flow chart diagramming one example of a process 500 to use a wearable electronic device to assist a user to enter data into a physical document, according to implementations described throughout this disclosure. The process 500 may utilize an image processing system on a wearable electronic device with at least one processing device, at least one speaker, an optional display, and memory storing instructions that when executed cause the processing device to perform the plurality of operations and computer implemented steps described in the claims. In general, the device 102, systems 200, and/or 600 may be used in the description and execution of process 500. The combination of device 102, systems 200 and/or 600 may, in some implementations, represent a single system.

In general, process 500 utilizes the systems and algorithms described herein to detect document data, obtain data associated with the document, and provide assistive data to enable a user to physically enter handwritten data into the document with the obtained data.

At block 502, the process 500 includes receiving, at a wearable electronic device, a cue to trigger a form-filling mode. For example, the wearable electronic device may include AR glasses 300, which may include storage 206 (e.g., memory), at least one camera input device 202, a speaker output device 204, and the at least one processing device (e.g., processors 208). When a user (e.g., wearing AR glasses 300) requests assistance to enter data into a form, the user may tap a control of the AR glasses 300, for example (e.g., a touch cue) to trigger a form-filling mode for the wearable electronic device 102. In some implementations, the cue includes a detected interaction with a control of the wearable electronic device where the control is configured with a touch pattern to trigger the form-filling mode. For example, a long press or short press or multiple press or any combination thereof may be configured as a cue to trigger the form-filling mode.

In some implementations, the process 500 includes receiving, at a wearable electronic device, an audible cue to trigger a form-filling mode. For example, the wearable electronic device may include AR glasses 300, which may include storage 206 (e.g., memory), at least one camera input device 202, a speaker output device 204, and the at least one processing device (e.g., processors 208). When a user (e.g., wearing AR glasses 300) requests assistance to enter data into a form, the user may utter an audible cue (e.g., an audible cue) to trigger a form-filling mode for the wearable electronic device 102. For example, the user may trigger an assistant device onboard AR glasses 300 by uttering a wake word to trigger the form-filling mode via an application (e.g., app data) running on processor 208AR glasses 300, as described with respect to FIG. 4. In some implementations, the AR glasses 300 may detect a plurality of fields in a physical form based on the physical form being within a field of view of the AR glasses 300.

At block 504, the process 500 includes triggering the at least one camera to capture an image of a physical form responsive to receiving the cue. For example, responsive to receiving the wake word as a cue or receiving a touch input or other input, the form-filling mode may be started and the AR glasses 300, using camera 316 and/or sensing system 310 may capture an image of the physical form (e.g., form 402). The physical form may include a number of fields. The AR glasses 300 may use captured images of the form to analyze the fields. In addition the AR glasses 300 may obtain information to accurately complete any or all of the fields. Moreover, the AR glasses 300 may store the obtained information in memory.

At block 506, the process 500 includes detecting, by the wearable electronic device (e.g., AR glasses 300), a hover input over a respective blank field in the plurality of fields. For example, the AR glasses may use sensing system 310 and camera 316 to determine a location of hover for writing utensil (e.g., utensil 110). The location may be correlated to a particular field (e.g., a blank field). In some implementations, the AR glasses 300 may track utensil 110 to determine the hover location.

In some implementations, the hover input is performed using the writing utensil 110 and detecting the hover input includes using the camera 316 to determine tracking data associated with the writing utensil 110. In some implementations, the tracking data tracks movement of the writing utensil 110 within a field of view of the AR glasses 300.

At block 508, the process 500 includes retrieving, based on the respective blank field and the stored information, a portion of the stored information to fill in the respective blank field. For example, the AR glasses 300 may retrieve stored information that correlates to a field name associated with the respective blank field. For example, if the field name is "Driver's License #," the AR glasses 300 may attempt to retrieve data associated with a driving license associated with user 100. In some implementations, retrieving the portion of the information is based on the tracking data and/or fields and locations associated with the tracking data.

At block 510, the process 500 includes providing the retrieved portion of the stored information via the wearable electronic device (e.g., the AR glasses 300). For example, the retrieved portion of the stored information may pertain to a driving license number for user 100. The entirety of the stored information may include all of the information form the driving license if, for example, the AR glasses have a stored image of the entire driving license.

In some implementations, the information may be provided in a display on AR glasses 300. For example, the AR glasses 300 may generate a first visual cue including text to be entered into the respective blank field (e.g., visual cue 418).

In some implementations, the information may be provided audibly via AR glasses 300. In some implementations, the information may be otherwise communicated to a user, for example, in a display of a companion mobile device, in a display associated with the wearable electronic device, or other electronically accessible source, etc. In some implementations, providing the information may include automatically filling out an electronic version of the physical form 402, for example, and sending the completed electronic version of the physical form 402 to the user. The user may then copy the information into the physical form without having to access several sources (e.g., a resume, an email, physical documents, the Internet, etc.).

In some implementations, guidance for the user when filling in the form can be provided to guide the user through the entire physical form. For example, in response to detecting respective field completion or an indication to skip the respective field, the AR glasses 300 may generate an audio response (e.g., an audio cue 412) that includes an audible output of text associated with the respective blank field (e.g., "Your driver's License # is" and an audible output of the portion (e.g., "LL1134 . . . ") of the stored information to fill in the respective field. The AR glasses 300 may also trigger, based on a detected location associated with the hover input (e.g., field 114 in FIG. 4), a second audio response to guide the user to another blank field in the plurality of fields (e.g., as shown by audio cue 414 in FIG. 4). Other non-audio cues are of course possible.

In some implementations, the process 500 may include triggering the AR glasses 300 to determine that particular information is unavailable for at least one of the plurality of fields. For example, the AR glasses 300 may instead determine that the driving license information is not stored or accessible to AR glasses 300. In response, the AR glasses 300 may trigger another audio response to audibly indicate an information source that can be accessed (e.g., as shown in audio cue 410). If the user provides the information, for example, by placing the license 408 according to audio cue 410, the AR glasses may detect access to the information source using the camera 316 and may trigger the camera to capture another image within the form-filling session. The additional image may include auxiliary data (e.g., the driving license number and related data) associated with the information source (i.e., the physical driving license 408). In addition, the AR glasses 300 may trigger another audio response to audibly indicate the auxiliary data (e.g., the driving license number) to guide the user to enter at least some of the auxiliary data into one of the fields (e.g., field 114) of form 402.

In some implementations, the method 500 may include the AR glasses 300 repeating until detecting completion of the physical form detecting a hover input over a respective blank field in the plurality of fields, retrieving a portion of the information to fill in the respective blank field, generating another audio response including an audible output of text associated with the respective blank field and an audible output of the portion of the information to fill in the respective field, detecting respective field completion or an indication to skip the respective field, triggering yet another audio response to guide the user to another blank field in the plurality of fields.

For example, the AR glasses 300 may continue to detect hover inputs for any remaining blank field in the plurality of fields and may continue to retrieve information to fill in the blank fields based on the respective blank field and the stored information. Additional audio responses (e.g., cues) may be generated by audio output 306 including an audible output of text associated with each of the respective blank fields and an audible output of the portion of the information to fill in the respective fields until detecting field completions or indications to skip particular respective fields. The additional audio responses (e.g., cues) may also guide the user through the form fields.

In some implementations, particular information for form filling or for provision audibly or visually to the user may be retrieved from a companion mobile device communicably coupled (wired or wirelessly) to the wearable electronic device. For example, a companion mobile device may be wirelessly connected to the wearable electronic device. The mobile device may retrieve information from a cloud based resource, the Internet, or other available source of data.

Examples described throughout this disclosure may refer to computer systems. As used herein, a computer system includes, without limitation, any suitable combination of one or more devices configured with hardware, firmware, and software to carry out one or more of the computerized techniques described herein. A computer system as used herein may be a single computing device or multiple computing devices working collectively and in which the storage of data and the execution of functions are spread out amongst the various computing devices.

Examples described throughout this disclosure may refer to augmented reality (AR). As used herein, AR refers to a user experience in which a computer system facilitates a sensory perception that includes at least one virtual aspect and at least one aspect of reality. An AR experience can be provided by any of multiple types of computer system, including, but not limited to, a wearable device. In some implementations, a wearable device can include an AR headset which may include, but is not limited to, AR glasses, another wearable AR device, a tablet, a watch, or a laptop computer.

In some types of AR experiences, the user can perceive the aspect of reality directly with his or her senses without intermediation by the computer system. For example, some AR glasses are designed to beam an image (e.g., the virtual aspect to be perceived) to the user's retina while also allowing the eye to register other light that was not generated by the AR glasses. As another example, an in-lens micro display can be embedded in a see-through lens, or a projected display can be overlaid on a see-through lens. In other types of AR experiences, a computer system can improve, complement, alter, and/or enable the user's impression of reality (e.g., the real aspect to be perceived) in one or more ways. In some implementations, an AR experience is perceived on a screen of a computer system's display device. For example, some AR headsets and/or AR glasses are designed with camera feedthrough to present a camera image of the user's surrounding environment on a display device positioned in front of the user's eye.

Examples described throughout this disclosure refer to input or gestures being detected by AR glasses. As used herein, detection of a gesture includes any way that AR glasses can recognize input from a user. A gesture can include, but is not limited to, any of a motion with a body part (e.g., a hand, finger, or arm) detected visually; a motion of a body part (e.g., the head, eyes, etc.) detected by accelerometer or other inertial measurement unit; or an input made using a physical object (e.g., writing utensil) or controller (e.g., a handheld controller) and detected by the AR glasses.

Examples described throughout this disclosure refer to forms. As used herein, a form is information in a physical or virtual medium. For example, an electronic form refers to information in digital form (e.g., as a computer-readable file on a storage medium). As another example, a hardcopy or physical document refers to printed information (e.g., information printed on paper). As another example, an on-screen presentation refers to information shown on a display device.

In some implementations, a physical form may be filled in by a user using AR smart glasses. The smart glasses may include cameras, speakers, displays, etc. The AR glasses may be triggered to operate in a form-filling mode using a wake word or phrase. Users wearing or otherwise accessing such AR glasses may receive a verbal/audio cue/response from the AR glasses when the user hovers/resets a pen, cursor, finger, or other object over a blank space (e.g., field) on a physical form. The user may write information in the fields of the physical form. Such information may be provided audibly or visibly by the AR glasses so the user can listen and write or copy information, from a view of the information, into the physical form. In some implementations, the AR glasses may read text to the user. For example, the user may point, hover, or otherwise indicate which text to be read to the user. The AR glasses may use hand-detection machine learning models, for example, to track and provide audible text. Such models ma be trained/learned based on previous information filled in by the user into the physical form (or another physical form) and/or from other data sources that store information that the user may wish to access and provide in a physical form.

In some implementations, the AR glasses may perform translations of particular text of the physical form. The translations may be in multiple languages and may be audibly and/or visually provided by the AR glasses. In some implementations, the AR glasses may scan an entire physical form to determine what the blank fields (or other fields) are in the form. The AR glasses may use such data to guide the user to position the writing utensil in the appropriate place to write in the requested information. In some implementations, the physical form may be filled in using an application of a smart device (e.g., a smart phone). For example, the application of a smart phone may capture an image of the physical form using the application and may present the filled electronic version of the form such that the user may copy the information into the physical form.

Figure 6:
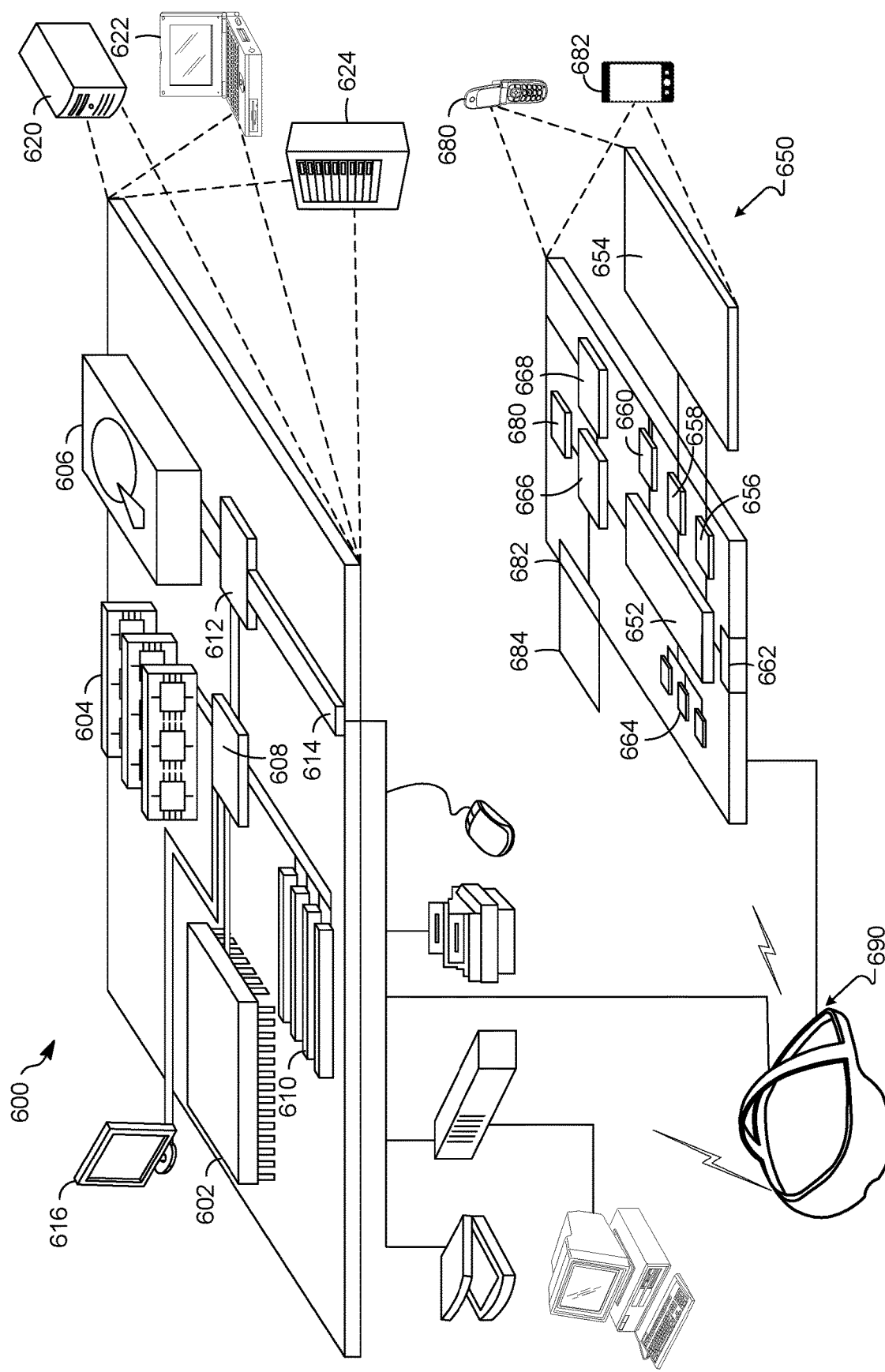
FIG. 6 illustrates an example of a computer device and a mobile computer device, which may be used with the techniques described herein.

FIG. 6 shows an example of a computer device 600 and a mobile computer device 650, which may be used with the described techniques. Computing device 600 can include a processor 602, memory 604, a storage device 606, a high-speed interface 608 connecting to memory 604 and high-speed expansion ports 610, and a low speed interface 612 connecting to low speed bus 614 and storage device 606. Components 602, 604, 606, 608, 610, and 612, are interconnected using various busses, and can be mounted on a common motherboard or in other manners as appropriate. Processor 602 can process instructions for execution within the computing device 600, including instructions stored in the memory 604 or on storage device 606 to display graphical information for a GUI on an external input/output device, such as display 616 coupled to high speed interface 608. In some implementations, multiple processors and/or multiple buses can be used, as appropriate, along with multiple memories and types of memory. In addition, multiple computing devices 600 can be connected, with each device providing portions of the necessary operations (e.g., as a server bank, a group of blade servers, or a multi-processor system).

Memory 604 stores information within computing device 600. In one embodiment, memory 604 is a volatile memory unit or units. In another embodiment, memory 604 is a non-volatile memory unit or units. Memory 604 may also be another form of computer-readable medium, such as a magnetic or optical disk.

Storage device 606 can provide mass storage for the computing device 600. In one embodiment, storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 604, storage device 606, or memory on processor 602.

High speed controller 608 manages bandwidth-intensive operations for computing device 600, while low speed controller 612 manages lower bandwidth-intensive operations. Such allocation of functions is exemplary only. In one embodiment, high-speed controller 608 is coupled to memory 604, display 616 (e.g., through a graphics processor or accelerator), and to high-speed expansion ports 610, which may accept various expansion cards (not shown). Low-speed controller 612 can be coupled to storage device 606 and low-speed expansion port 614. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices may contain one or more of computing device 600, 650, and an entire system may be made up of multiple computing devices 600, 650 communicating with each other.

Computing device 650 includes processor 652, memory 664, an input/output device such as display 654, communication interface 666, and transceiver 668, among other components. Device 650 may also be provided with a storage device, such as a microdrive or other device, to provide additional storage. Each of components 650, 652, 664, 654, 666, and 668, are interconnected using various buses, and several of the components may be mounted on a common motherboard or in other manners as appropriate.

Processor 652 can execute instructions within the computing device 650, including instructions stored in memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to display 654. Display 654 may be, for example, a TFT LCD (Thin-Film-Transistor Liquid Crystal Display) or an OLED (Organic Light Emitting Diode) display, or other appropriate display technology. Display interface 656 may comprise appropriate circuitry for driving display 654 to present graphical and other information to a user. Control interface 658 may receive commands from a user and convert them for submission to processor 652. In addition, external interface 662 may communicate with processor 652, so as to enable near area communication of device 650 with other devices. External interface 662 can provide, for example, for wired or wireless communication In some implementations multiple interfaces can be used.

Memory 664 stores information within computing device 650. Memory 664 can be implemented as one or more of a computer-readable medium or media, a volatile memory unit or units, or a non-volatile memory unit or units. Expansion memory 684 may also be provided and connected to device 650 through expansion interface 682, which may include, for example, a SIMM (Single In Line Memory Module) card interface. Such expansion memory 684 may provide extra storage space for device 650, or may also store applications or other information for device 650. Specifically, expansion memory 684 may include instructions to carry out or supplement the processes described above, and may include secure information also. Thus, for example, expansion memory 684 can be a security module for device 650, and can be programmed with instructions that permit secure use of device 650. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 664, expansion memory 684, or memory on processor 652 that may be received, for example, over transceiver 668 or external interface 662.

Device 650 can communicate wirelessly through communication interface 666, which can include digital signal processing circuitry where necessary. Communication interface 666 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 680 can provide additional navigation- and location-related wireless data to device 650, which can be used as appropriate by applications running on device 650.

Device 650 can also communicate audibly using audio codec 660, which may receive spoken information from a user and convert it to usable digital information. Audio codec 660 may likewise generate audible sounds for a user, such as through a speaker, e.g., in a handset of device 650. Such sound can include sound from voice telephone calls, can include recorded sound (e.g., voice messages, music files, etc.) and can also include sound generated by applications operating on device 650.

Computing device 650 can be implemented in a number of different forms, as shown in the figure. For example, it can be implemented as cellular telephone 680. It can also be implemented as part of smart phone 682, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 6 can include sensors that interface with a virtual reality headset (VR/AR/MR headset/HMD/wearable device 690). For example, one or more sensors included on computing device 650 or other computing device depicted in FIG. 6, can provide input to headset 690 or in general, provide input to a VR/AR space. The sensors can include, but are not limited to, a touchscreen, accelerometers, gyroscopes, pressure sensors, biometric sensors, temperature sensors, humidity sensors, and ambient light sensors. Computing device 650 can use the sensors to determine an absolute position and/or a detected rotation of the computing device in the VR/AR space that can then be used as input to the VR/AR space. For example, computing device 650 may be incorporated into the VR/AR space as a virtual object, such as a controller, a laser pointer, a keyboard, a weapon, etc. Positioning of the computing device/virtual object by the user when incorporated into the VR/AR space can allow the user to position the computing device to view the virtual object in certain manners in the VR/AR space.

In some implementations, one or more input devices included on, or connected to, the computing device 650 can be used as input to the VR/AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the VR/AR space can cause a particular action to occur in the VR/AR space.

In some implementations, one or more output devices included on the computing device 650 can provide output and/or feedback to a user of the VR headset 690 in the VR/AR space. The output and feedback can be visual, tactical, or audio. The output and/or feedback can include, but is not limited to, rendering the VR/AR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 650 can be placed within VR headset/augmented reality (AR) headset/mixed reality (MR) headset 690 to create a VR/AR/MR system. Headset 690 can include one or more positioning elements that allow for the placement of computing device 650, such as smart phone 682, in the appropriate position within headset 690. In such embodiments, the display of smart phone 682 can render stereoscopic images representing the VR/AR space or virtual environment.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the VR/AR space. As just one example, computing device can be a laser pointer. In such an example, computing device 650 appears as a virtual laser pointer in the computer-generated, 3D environment. As the user manipulates computing device 650, the user in the VR/AR space sees movement of the laser pointer. The user receives feedback from interactions with the computing device 650 in the VR environment on the computing device 650 or on the VR headset 690.

In some implementations, a computing device 650 may include a touchscreen. For example, a user can interact with the touchscreen in a particular manner that can mimic what happens on the touchscreen with what happens in the VR/AR space. For example, a user may use a pinching-type motion to zoom content displayed on the touchscreen. This pinching-type motion on the touchscreen can cause information provided in the VR/AR space to be zoomed.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR/AR space to control objects in the VR/AR space.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method configured to perform operations with at least one processing device, the operations including:
receiving, at a wearable electronic device, a cue to trigger a form-filling mode, the wearable electronic device including memory, at least one camera and the at least one processing device;
responsive to receiving the cue, triggering, by the wearable electronic device, the at least one camera to capture an image of a physical form, the physical form including a plurality of fields, wherein the wearable electronic device uses the image to analyze the plurality of fields, obtain information to complete the plurality of fields, and store the obtained information in the memory;
responsive to detecting, by the wearable electronic device, a hover input over a respective blank field in the plurality of fields, wherein detecting the hover input triggers the at least one camera to perform object detection based on movement associated with the respective blank field:
   retrieving, based on the respective blank field and the stored information, a portion of the stored information to fill in the respective blank field; and
   providing, for display on the wearable electronic device, the retrieved portion of the stored information; and
in response to detecting respective field completion or an indication to skip the respective field, triggering a first audio response to guide a user wearing the wearable electronic device to another blank field in the plurality of fields, wherein the first audio response comprises directional instructions to move to the another blank field.

2. The method of claim 1, wherein the operations further comprise:
   in response to detecting respective field completion or an indication to skip the respective field, generating, at the wearable electronic device, a second audio response including an audible output of text associated with the respective blank field and an audible output of the portion of the stored information to fill in the respective field.

3. The method of claim 2, wherein the operations further comprise:
   in response to determining that information is unavailable for at least one of the plurality of fields:
   triggering a third audio response to audibly indicate an information source that can be accessed;
   detecting access of the information source, by the wearable electronic device using the at least one camera, and triggering the at least one camera to capture a second image, the second image including auxiliary data associated with the information source; and
   triggering a fourth audio response to audibly indicate the auxiliary data to guide the user to enter at least some of the auxiliary data into the at least one of the plurality of fields.

4. The method of claim 1, wherein the cue is an audible cue and the operations further comprise:
   generating, at the wearable electronic device, a first visual cue including text to be entered into the respective blank field, the text to be entered including the portion of the stored information.

5. The method of claim 1, wherein:
   the wearable electronic device comprises augmented reality (AR) glasses that detect the plurality of fields in the physical form based on the physical form being within a field of view of the AR glasses; and
   the cue comprises a detected interaction with a control of the wearable electronic device, the control configured with a touch pattern to trigger the form-filling mode.

6. The method of claim 1, wherein:
   the hover input is performed using a writing utensil; and
   detecting the hover input includes using the at least one camera to determine tracking data associated with the writing utensil, wherein the tracking data includes information about tracking the movement, wherein the movement is associated with the writing utensil that is within a field of view of the wearable electronic device.

7. The method of claim 6, wherein retrieving the portion of the information is based on the tracking data.

8. The method of claim 1, wherein the operations further comprise:
   repeating until detecting completion of the physical form:
   detecting, by the wearable electronic device, a hover input over a respective blank field in the plurality of fields;
   retrieving, based on the respective blank field and the stored information, a portion of the information to fill in the respective blank field;
   generating, at the wearable electronic device, another audio response including an audible output of text associated with the respective blank field and an audible output of the portion of the information to fill in the respective field;
   detecting respective field completion or an indication to skip the respective field; and
   triggering, based on a detected location associated with the hover input, yet another audio response to guide a user wearing the wearable electronic device to another blank field in the plurality of fields.

9. A wearable electronic device comprising:
   at least one processing device;
   at least one camera;
   at least one output source; and
   a memory storing instructions that when executed cause the wearable electronic device to perform operations including:
   receiving an audible cue to trigger a form-filling mode,
   responsive to receiving the audible cue, triggering the at least one camera to capture an image of a physical form, the physical form including a plurality of fields, wherein the wearable electronic device uses the image to analyze the plurality of fields, obtain information to complete the plurality of fields, and store the obtained information in the memory;
   responsive to detecting a hover input over a respective blank field in the plurality of fields, wherein detecting the hover input triggers the at least one camera to perform object detection based on movement associated with the respective blank field:
      retrieving, based on the respective blank field and the stored information, a portion of the stored information to fill in the respective blank field; and
      providing, for display on the wearable electronic device, the retrieved portion of the stored information; and
   in response to detecting respective field completion or an indication to skip the respective field, triggering a first audio response to guide a user wearing the wearable electronic device to another blank field in the plurality of fields, wherein the first audio response comprises directional instructions to move to the another blank field.

10. The wearable electronic device of claim 9, wherein the operations further comprise:
    in response to detecting respective field completion or an indication to skip the respective field, generating, at the wearable electronic device, a second audio response including an audible output of text associated with the respective blank field and an audible output of the portion of the stored information to fill in the respective field.

11. The wearable electronic device of claim 9, wherein the wearable electronic device includes a display, and wherein the operations further comprise:
    generating, at the display of the wearable electronic device, a first visual cue including text to be entered into the respective blank field, the text to be entered including the portion of the stored information.

12. The wearable electronic device of claim 9, wherein the wearable electronic device comprises augmented reality (AR) glasses and the AR glasses detect the plurality of fields in the physical form based on the physical form being within a field of view of the AR glasses.

13. The wearable electronic device of claim 9, wherein: the hover input is performed using a writing utensil; and detecting the hover input includes using the at least one camera to determine tracking data associated with the writing utensil, wherein the tracking data includes information about tracking the movement, wherein the movement is associated with the writing utensil that is within a field of view of the wearable electronic device.

14. A non-transitory, machine-readable medium having instructions stored thereon, the instructions, when executed by a processor, cause a computing device to:
receive, at a wearable electronic device, an audible cue to trigger a form-filling mode, the wearable electronic device including at least one camera;
responsive to receiving the audible cue, trigger, by the wearable electronic device, the at least one camera to capture an image of a physical form, the physical form including a plurality of fields, wherein the wearable electronic device uses the image to analyze the plurality of fields, obtain information to complete the plurality of fields, and store the obtained information;
responsive to detecting, by the wearable electronic device, a hover input over a respective blank field in the plurality of fields, wherein detecting the hover input triggers the at least one camera to perform object detection based on movement associated with the respective blank field:
retrieve, based on the respective blank field and the stored information, a portion of the stored information to fill in the respective blank field; and
provide, for display on the wearable electronic device, the retrieved portion of the stored information; and
in response to detecting respective field completion or an indication to skip the respective field, triggering a first audio response to guide a user wearing the wearable electronic device to another blank field in the plurality of fields, wherein the first audio response comprises directional instructions to move to the another blank field.

15. The machine-readable medium of claim 14, wherein the instructions further comprise:
in response to detecting respective field completion or an indication to skip the respective field, generating, at the wearable electronic device, a second audio response including an audible output of text associated with the respective blank field and an audible output of the portion of the stored information to fill in the respective field.

16. The machine-readable medium of claim 15, wherein the instructions further comprise:
in response to determining that information is unavailable for at least one of the plurality of fields:
triggering a third audio response to audibly indicate an information source that can be accessed;
detecting access of the information source, by the wearable electronic device using the at least one camera, and triggering the at least one camera to capture a second image, the second image including auxiliary data associated with the information source; and
triggering a fourth audio response to audibly indicate the auxiliary data to guide the user to enter at least some of the auxiliary data into the at least one of the plurality of fields.

17. The machine-readable medium of claim 14, wherein the instructions further comprise:
generating, at the wearable electronic device, a first visual cue including text to be entered into the respective blank field, the text to be entered including the portion of the stored information.

18. The machine-readable medium of claim 14, wherein the wearable electronic device comprises augmented reality (AR) glasses and the AR glasses detect the plurality of fields in the physical form based on the physical form being within a field of view of the AR glasses.

19. The machine-readable medium of claim 14, wherein: the hover input is performed using a writing utensil; and detecting the hover input includes using the at least one camera to determine tracking data associated with the writing utensil, wherein the tracking data includes information about tracking the movement, wherein the movement is associated with the writing utensil that is within a field of view of the wearable electronic device.

20. The machine-readable medium of claim 19, wherein retrieving the portion of the information is based on the tracking data.

* * * * *